(12) United States Patent
Murphy

(10) Patent No.: US 7,332,078 B2
(45) Date of Patent: Feb. 19, 2008

(54) APPARATUS FOR RECOVERING ENERGY FROM TURBULENCE CREATED WITHIN AN AEROBIC BIOLOGICAL REACTOR

(76) Inventor: Dee Thomas Murphy, 7630 Tholl Dr., Reno, NV (US) 89506

( * ) Notice: Subject to any disclaimer, the term of this patent is extended or adjusted under 35 U.S.C. 154(b) by 0 days.

(21) Appl. No.: 11/488,500

(22) Filed: Jul. 18, 2006

(65) Prior Publication Data

US 2007/0012620 A1    Jan. 18, 2007

Related U.S. Application Data

(60) Provisional application No. 60/700,270, filed on Jul. 18, 2005.

(51) Int. Cl.
*C02F 3/00* (2006.01)

(52) U.S. Cl. .................... 210/220; 210/150; 210/151

(58) Field of Classification Search ............... 210/220, 210/150, 151
See application file for complete search history.

(56) References Cited

U.S. PATENT DOCUMENTS 4,904,420 A * 2/1990 Cornelissen ................ 261/92

\* cited by examiner

*Primary Examiner*—Chester T. Barry

(57) ABSTRACT

A novel method and apparatus that takes advantage of both the aeration dynamics provided along with the free resulting hydro energy created by the flotation dynamics of the air bubbles and most importantly recover more energy than is required to operate the aeration basin as a result of the bonus hydro energy realized.

5 Claims, 2 Drawing Sheets

US 7,332,078 B2

APPARATUS FOR RECOVERING ENERGY FROM TURBULENCE CREATED WITHIN AN AEROBIC BIOLOGICAL REACTOR

RELATED PRIOR ART

This application is derived from my provisional application No. 60/700,270, which was filed on Jul. 18, 2005 in the name of the current inventor. It is to be noted no new material has been entered.

FIELD OF THE INVENTION

This method/apparatus relates in general to any means of capturing energy that is created from the motivation of liquid, more commonly referred to in the wastewater industry as mixed liquor, and converting it back into electricity. During the aeration of a wastewater treatment and/or a water reclamation process, mixing and aeration is initiated by a mechanical means. This mechanical mixing and aeration forces the movement of the contents within the basin and/or reactor in either a general vertical direction or a general horizontal direction. A substantial amount of electrical energy is utilized to initiate the biological action that results in the treatment of the wastewater and/or reclamation of the water. Until now, the hydraulic forces and velocities naturally created by this aeration and mixing heretofore have not been harnessed in an effort to recover the energy consumed during the treatment process. The present invention is a method and apparatus that harnesses the hydraulic forces within the aeration basins by the rising bubbles created from the diffusers located at the bottom of the aeration basin. In vertical aeration/mixing aeration basins, air is introduced into the aeration basins from the bottom through aeration methods, such as diffusers by electric air blowers and the like. The electric air blowers move the air to the diffusers where the air is released into the bottom of the tank. Upon leaving the diffuser, the air is divided into numerous bubbles that rise to the top of the liquid within the basin. In the process of rising to the top, they force the liquid contents within the basin in the same vertical direction that the bubbles are traveling as a result of their floatation dynamics. As the bubbles rise, they in turn move the liquid contents within the aeration basin in the same direction as the bubbles are traveling and at almost the same velocity that the bubbles are rising at. This floatation dynamic of the air bubble causes the movement of the hydraulic contents. It is a common known fact that it requires more energy to move liquid as compared to the moving of air. Therefore, the free flotation dynamics of the rising bubbles convert to hydropower. Thus, creating more energy that can be utilized and harnessed resulting from the vertical movement of the liquid that creates hydraulic velocity resulting from the vertical rise of the bubbles. The present invention is a method, energy conveyance process including an apparatus that converts that hydraulic velocity into the generation of electricity.

The same applies to the horizontal movement of the liquid contents in a basin that uses horizontal mixing and aeration techniques. The present invention is also adaptable to all aeration basins where aeration is used to biologically degrade organics in a treatment process. Thus the present invention capitalizes on the pre-existing hydraulic velocity created as well as utilizes the floatation forces inherent therein to renew the energy resource used to aerate and mix the aeration basin.

BACKGROUND OF THE INVENTION

Until now, there has only been one common method practiced for recovering energy from the treatment of organics associated with a waste stream. This commonly practiced method utilizes the anaerobic conversion process commonly known throughout the industry as a "primary" biological treatment process. This process recovers the methane gas generated from the decomposition of organic matter that takes place within the anaerobic reactor and uses it for fuel to power a motor that in turn runs a generator to generate electricity.

There are many drawbacks and disadvantages to the above noted method and the present invention addresses and resolves these drawbacks and disadvantages in a manner heretofore not taught. Some of the disadvantages of the anaerobic reactor biogas generation process is it is very operator intensive, it is extremely odorous, the process is very volatile and non forgiving as it is a direct result of deriving a benefit from the biological process which has many fluctuating factors which aren't consistent and therefore must be monitored very closely by trained and qualified operating engineers. The process is explosive thereby representing a danger. It is very corrosive which causes high maintenance requirements and associated costs. And the recovery benefit is generally less than a third of the required energy to operate the process.

Another recent approach is the development of the microbial fuel cell. However, this is also a method of utilizing anaerobic digestion. In this hybrid of the anaerobic reactor process, wastewater is treated anaerobically using a bacterial biofilm growing on one electrode of the fuel cell. As can be seen, the microbial fuel cell may have promise, but for now is just a hybrid of the conventional anaerobic biogas generator sharing many of the disadvantages of the same.

As of now, large amounts of energy in the form of electricity are being used in the name of sanitation and protection of the public health and the environment. However, until now, there have not been methods or processes that efficiently recover that electricity used in a conventional secondary treatment process. This is a substantial amount of non-recovered energy consumed per day.

In 2001, PG&E conducted a study on twelve (12) treatment processes. The plant flow ranged from 1.7 MGD to 60.4 MGD. The electricity use ranged from 978 kWh/MG/day to 4,630 kWh/MG/day. The energy used for aeration represented 27% to 82% of the total plant operation electricity requirement.

In 1999, a Multi-Agency Study was conducted by seven (7) participating agencies. That study found that treatment costs of facilities studied ranged from $530/MG/day to $976/MG/day, averaging out at $729/MG/day. The objective of this present invention is to recover as much electricity as possible to offset the cost of providing the treatment.

As the turbulence within the aeration basins are a result of a necessity to provide aeration and mixing in every waste treatment plant that exists, we must capitalize on this requirement and establish the way to have the renewable resource as a result.

OBJECTS AND ADVANTAGES OF THE INVENTION

A primary object of the present invention is to provide a method and apparatus that utilizes pre-existing energy sources naturally occurring within an aerobic biological reactor to renew the primary resource consumed, namely electricity.

A further object of the present invention is to provide a method and apparatus that incorporates use of known proven prior art typically associated with wastewater treatment systems. For example, the most effective system to date is taught within my U.S. Pat. No. 5,186,821 which accomplishes new and unusual results due to the novel "IVEC"

(Influent Velocity Equalization Collector) AND "OMNI FLOW PARTITION" as taught within my U.S. Pat. Nos. 5,384,049, 5,374,353 and 5,316,671 both of which are utilized within the present invention. A further improvement and advantage of the present invention is use of a "MBR module" also taught within my current pending application that further provides unusual new results not previously incorporated in combination within such systems.

A primary object of the present invention is to further include novel use of at least one paddle wheel that is automatically rotated by bubbles created from the air diffusers. Thus the paddle wheel due to free energy rotation can be used for energy transfer to a generator and/or backup batteries, respectively. This is extremely important as no back-up generator or the like is necessary and as a result greatly reduces costs associated with other similar systems.

Another object of the present invention is to provide a method and apparatus that is reliable, economical to establish, operate and maintain. Most importantly the present invention eliminates the need for expensive equipment, continuous maintenance and numerous components associated with all of the known prior art. For example, the need for clarifiers, filters, decanters, a back-up generator, etc have all been eliminated.

A further object of the present invention is to provide a method and apparatus that takes advantage of both the aeration dynamics provided along with the free resulting hydro energy created by the flotation dynamics of the air bubbles and most importantly recover more energy than is required to operate the aeration basin as a result of the bonus hydro energy realized.

Other objects and advantages will be seen when taken into consideration with the following specification and drawings.

DETAILED DESCRIPTION OF THE DRAWINGS

Referring now in detail to the drawings wherein like characters refer to like elements throughout the various views. As herein depicted within FIGS. 1 and 2, (10) represents a general overview of the preferred embodiment for the present invention. However, it is to be noted the method and apparatus as taught herein is only illustrative of one embodiment as numerous embodiments and variable construction options are inherent. Thus, the invention is not to be limited to the following description, as the general concept of capturing and utilizing free energy created from the air-diffusers rising bubbles is considered to be the main improvement and these unusual new end results heretofore have not been taught.

Figure 1:
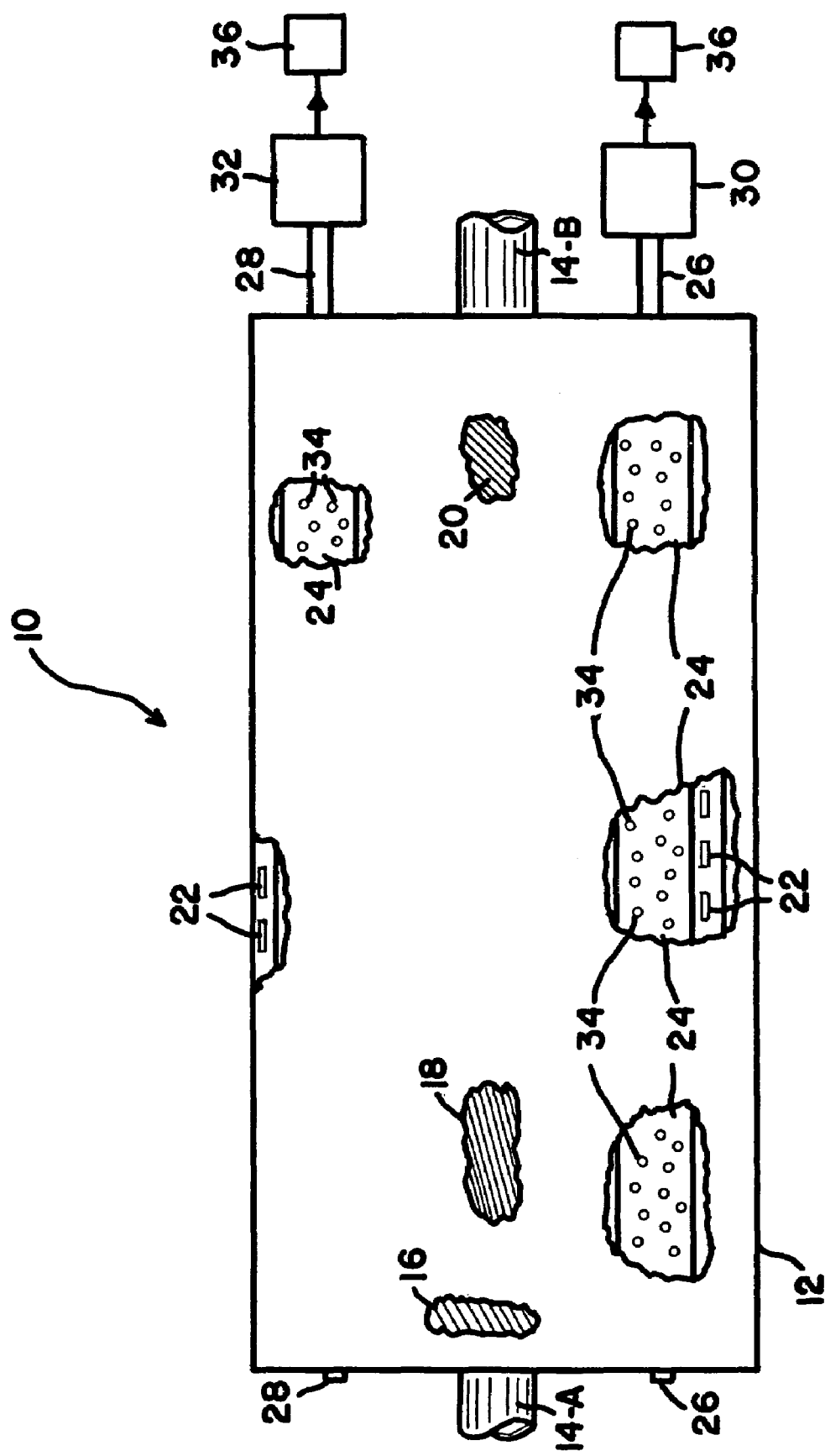
FIG. 1 substantially represents a basic plan overview of one embodiment for the present invention.
Figure 2:
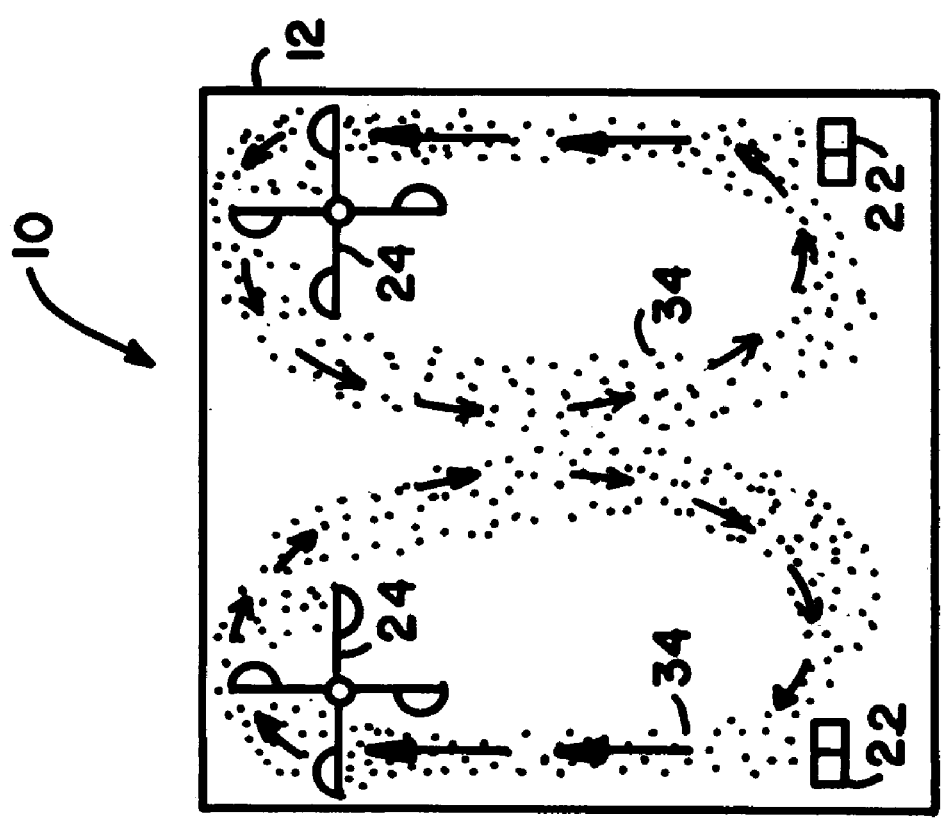
FIG. 2 substantially represents a plan view depicting internal turbulence liquid flows and exemplifies free rotational energy that can be transferred to electricity.

Within FIGS. 1 and 2, (12) represents a typical aerobic biological reactor formed from a housing having an inlet pipe (14-A) for delivery of wastewater influent there through and an outlet pipe (14-B) for expelling reclaimed purified water. The housing of the biological reactor (12) further includes an IVE collector (16), an OMI flow partition (18), an MBR decanter (20) and typical internal air-diffusers (22) all of which are taught and known within the prior art. Thus their actual construction and workings are not taught herein.

The housing of the biological reactor (12) further includes at least one paddle wheel (24) respectively, or additional paddle wheels such as (26), this depends upon engineering choice, size etc. The paddle wheels (24 & 26) are mounted on free rotating rods (26 & 28) and thus transfer free rotational energy there from that can be used for energizing a typical generator such as illustrated by (30 & 32). Thereafter, the generator can be used to either return the free energy back into the system for re-use and/or it may be transferred to batteries (34 & 36) or the like for later use.

The actual method or process is as follows: The air diffusers (22) are located at the bottom of the housing of aerobic biological reactor (12). Air is forcibly directed upwardly from the air diffusers (22) thus forming air bubbles (34) within the liquid (not shown). Due to natural dynamics of such air bubbles (34) they automatically rise to the top. As the air bubbles (34) rise to the top the liquid is also forcibly directed upwardly in the same direction. As a result thereof, each of the paddle wheels (24 & 26) begin to rotate the rods (26 & 28) thus providing rotational force that can then be converted into free energy for transfer to the generators (30 & 32) and thus results in free energy for production of electricity.

For optimum performance, at least one paddle wheel (24) is located just below the liquid surface. Additionally, the air bubbles collect as they come in contact with the paddle wheel creating floatation force and additional lift energy on the paddle wheel paddle. In the preferred embodiment the paddle wheel paddle(s) are substantially cup-shaped to collect the forces and retain the energy until the air is released as the paddle reaches a substantial vertical position in its rotation. The hydraulic energy carries through until it is able to return back downward in its travel toward the bottom of the tank within the pattern that is created from the aeration action, such as illustrated within FIG. 2, for exemplary purposes.

It will now be seen I have herein taught a new and improved method/apparatus for the treatment of wastewater that utilizes pre-existing prior art and incorporates paddle wheels which in combination therewith captures free energy that may then be converted into electricity in an environmentally friendly manner. Therefore the overall performance of the wastewater treatment system is greatly improved and much more efficient and cost effective, in a manner heretofore not previously taught.

Although the invention has been herein shown and described in what is conceived to be the most practical and preferred embodiment, it is recognized that departures may be made there from within the scope and spirit of the invention, which is not to be limited to the details disclosed herein but is to be accorded the full scope of the claims so as to embrace any and all equivalent devices and apparatuses.

Having described the invention, what I claim as new and desire to secure by Letters Patent is:

1. An apparatus for recovering energy from turbulence created within an aerobic-biological-reactor comprising: an aerobic-biological-reactor formed from a housing having an inlet pipe for delivery of wastewater influent there through, said housing having an outlet pipe for expelling reclaimed purified water there from, said housing containing liquid, an influent velocity equalization collector, an omni flow partition, a membrane biological reactor, internal air-diffusers and at least one paddle wheel, said at least one paddle wheel being located just below the surface of said liquid, said at least one paddle wheel being mounted on a free rotating rod, said air diffusers are located at the bottom of said housing, air is forcibly directed upwardly from said air diffusers resulting in production of air bubbles within said liquid, said air bubbles and said liquid are forcibly directed upwardly, said air bubbles collect upon rising until contact with said at least one paddle wheel, and upon contact said air bubbles with said at least one paddle wheel automatically turn said free rotating rod resulting in free rotational force that is transferable for use as free energy.

2. The apparatus for recovering energy from turbulence created within an aerobic-biological-reactor of claim 1 wherein said at least one paddle wheel is cup-shaped to collect the forces and retain the energy until said at least one paddle reaches a vertical position upon rotation then the air is released, this resultant hydraulic energy carries through until returning back downward toward said bottom of said housing resulting in a pattern created from the aeration action.

3. The apparatus for recovering energy from turbulence created within an aerobic-biological-reactor of claim 1 wherein said free rotational force that is transferable for use as free energy includes at least one generator.

4. The apparatus for recovering energy from turbulence created within an aerobic-biological-reactor of claim 3 wherein said at least one generator is used to return said free energy back into the system.

5. The apparatus for recovering energy from turbulence created within an aerobic-biological-reactor of claim 3 wherein said at least one generator is used to transfer said free energy to at least one battery.

\* \* \* \* \*